United States Patent
Biehle et al.

(10) Patent No.: US 10,453,342 B2
(45) Date of Patent: Oct. 22, 2019

(54) METHODS, DEVICES, AND COMPUTER PROGRAMS FOR PROVIDING INFORMATION ABOUT A DANGEROUS SITUATION ON A VEHICLE-TO-VEHICLE INTERFACE

(71) Applicant: VOLKSWAGEN AKTIENGESELLSCHAFT, Wolfsburg (DE)

(72) Inventors: Thomas Biehle, Gross Oesingen (DE); Holger Schultz, Falkensee (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 0 days.

(21) Appl. No.: 16/075,024

(22) PCT Filed: Jan. 31, 2017

(86) PCT No.: PCT/EP2017/052026
§ 371 (c)(1),
(2) Date: Aug. 2, 2018

(87) PCT Pub. No.: WO2017/134046
PCT Pub. Date: Aug. 10, 2017

(65) Prior Publication Data
US 2019/0043358 A1    Feb. 7, 2019

(30) Foreign Application Priority Data

Feb. 3, 2016 (DE) .................. 10 2016 201 662
Feb. 5, 2016 (DE) .................. 10 2016 201 794

(51) Int. Cl.
*B60Q 1/00* (2006.01)
*G08G 1/16* (2006.01)
(Continued)

(52) U.S. Cl.
CPC .......... *G08G 1/162* (2013.01); *G08G 1/0965* (2013.01); *G08G 1/096791* (2013.01); *H04W 4/46* (2018.02)

(58) Field of Classification Search
CPC ......... H04B 10/116; H04W 4/46; G08G 1/16; G08G 1/091; G08G 1/0962; G08G 1/162; (Continued)

(56) References Cited

U.S. PATENT DOCUMENTS 6,765,495 B1 * 7/2004 Dunning ............... G08G 1/161
340/435
8,552,886 B2 * 10/2013 Bensoussan ............. B60Q 1/52
340/905
(Continued)

FOREIGN PATENT DOCUMENTS

DE       19922608 A1    11/2000
DE    102004021186 A1    12/2005
(Continued)

OTHER PUBLICATIONS

Search Report for German Patent Application No. 10 2016 201 794.2; dated Nov. 29, 2016.
(Continued)

*Primary Examiner* — Toan N Pham
(74) *Attorney, Agent, or Firm* — Barnes & Thornburg LLP

(57) ABSTRACT

Methods, devices, and computer programs for a transportation vehicle including receiving information about a triggering of one or more functions of the transportation vehicle, determining a dangerous situation based on the one or more triggered functions of the transportation vehicle based on an actual activity of the driver of the transportation vehicle, and providing information about the dangerous situation to a vehicle-to-vehicle interface.

15 Claims, 9 Drawing Sheets

(51) Int. Cl.
*G08G 1/0965* (2006.01)
*G08G 1/0967* (2006.01)
*H04W 4/46* (2018.01)

(58) Field of Classification Search
CPC .. G08G 1/166; G08G 1/096791; B60W 50/14
USPC .................. 340/435, 902, 903, 425.5, 436
See application file for complete search history.

(56) References Cited

U.S. PATENT DOCUMENTS

| | | | |
|---|---|---|---|
| 9,142,128 B2* | 9/2015 | Shin | G08G 1/096791 |
| 2008/0055068 A1* | 3/2008 | Van Wageningen | H04W 52/10 |
| | | | 340/539.3 |
| 2008/0275618 A1* | 11/2008 | Grimm | G08G 1/162 |
| | | | 701/96 |
| 2017/0084175 A1* | 3/2017 | Sedlik | G08G 1/0112 |
| 2019/0052359 A1* | 2/2019 | Brady | H04B 10/116 |

FOREIGN PATENT DOCUMENTS

| | | |
|---|---|---|
| DE | 102008018868 A1 | 10/2008 |
| DE | 102007058538 A1 | 6/2009 |
| DE | 102008061304 A1 | 7/2009 |
| DE | 102008042539 A1 | 4/2010 |
| DE | 102012204098 A1 | 9/2013 |
| DE | 102013021835 A1 | 6/2015 |
| GB | 2149169 A | 6/1985 |

OTHER PUBLICATIONS

Search Report for International Patent Application No. PCT/EP2017/052026; dated Jul. 7, 2017.

* cited by examiner

METHODS, DEVICES, AND COMPUTER PROGRAMS FOR PROVIDING INFORMATION ABOUT A DANGEROUS SITUATION ON A VEHICLE-TO-VEHICLE INTERFACE

PRIORITY CLAIM

This patent application is a U.S. National Phase of International Patent Application No. PCT/EP2017/052026, filed 31 Jan. 2017, which claims priority to German Patent Application Nos. 10 2016 201 662.8, filed 3 Feb. 2016, and 10 2016 201 794.2, filed 5 Feb. 2016, the disclosures of which are incorporated herein by reference in their entireties.

SUMMARY

Illustrative embodiments relate to methods, devices and computer programs for providing information about a dangerous situation via a vehicle-to-vehicle interface, more specifically, but not exclusively, based on information about a triggering of at least one function of the transportation vehicle.

BRIEF DESCRIPTION OF THE DRAWINGS

Disclosed embodiments are described in further detail below on the basis of the drawings, to which the exemplary embodiments are not limited overall. Shown are.

DETAILED DESCRIPTION

Figure 1A:
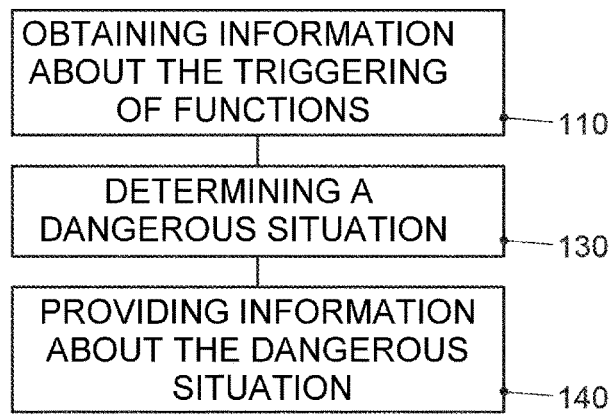
FIG. 1a shows a flow chart of a method for providing information about a dangerous situation.

Vehicle-to-vehicle communication (also Car2Car, C2C, or Vehicle2Vehicle, V2V) and vehicle-to-infrastructure communication (also Car2Infrastructure, C2I or Vehicle2Roadside, V2R) are a focal point of automotive research in the 21st century. The communication between transportation vehicles or between transportation vehicles or transport infrastructure allows a multitude of novel possibilities, such as a co-ordination between transportation vehicles or a communication of transportation vehicles with the transport infrastructure, for example, to provide traffic jam warnings to the transportation vehicles. In this situation, the transportation vehicles which are designed for C2C or C2I (also grouped together under vehicle-to-X communication, Car2X, C2X or vehicle2X, V2X) have a transmitting and receiving unit to be able to communicate with other transportation vehicles, for example, via direct radio connections or mobile radio networks. Such communication can be limited, for example, between transportation vehicles or between transportation vehicles and transport infrastructure within a radius of a few hundred meters.

A functionality intended for vehicle-to-vehicle communication is a warning function for transportation vehicles in an environment. In the event of accidents for example, a transportation vehicle can issue a message and warn transportation vehicles which are approaching the site of the accident. However, it may be desirable to issue warnings before the accident happens, so that, for example, transportation vehicles in the immediate vicinity can react more quickly.

There is a need for an improved approach to providing information about a dangerous situation. This demand is met by the independent claims.

Exemplary embodiments can achieve this by, for example, evaluating information about a triggering of functions of the transportation vehicle, such as active safety systems, or signaling systems of a special response transportation vehicle. If such safety systems are triggered, and if other conditions are fulfilled as appropriate, then a transportation vehicle can provide a warning signal to other transportation vehicles in the surroundings via a vehicle-to-vehicle interface, so that these can warn the respective drivers.

Exemplary embodiments create a method for a transportation vehicle. The method comprises obtaining information about a triggering of one or more functions of the transportation vehicle. The method also comprises determining a dangerous situation, based on the one or more triggered functions of the transportation vehicle, and depending on a current activity of a driver of the transportation vehicle. The method also comprises providing information about the dangerous situation via a vehicle-to-vehicle interface. By providing the information about the dangerous situation based on the triggering of the at least one function of the transportation vehicle, transportation vehicles in a surrounding area can be alerted to dangerous situations at an early stage.

For example, the current activity of the driver of the transportation vehicle can correspond to controlling a transportation vehicle. The one or more functions can comprise at least one active safety system of the group comprising a safety system for triggering a flashing light based on an emergency braking, safety system for autonomous braking intervention and a safety system for a reversible transportation vehicle occupant restraint system. By providing the information about the dangerous situation based on the triggering of the at least one active safety system, transportation vehicles can be alerted to dangerous situations in an environment at an early stage.

For example, the information about the triggering of one or more functions of the transportation vehicle can comprise information about a triggering of the at least one active safety system. The information about the triggering of the at least one active safety system can be based on a detection of an impending accident. The obtaining of the information about the triggering of one or more functions of the transportation vehicle can occur before an impending accident.

For example, the active safety system can be designed to provide the information about the triggering of the active safety system before an impending accident. The provision of the information about the dangerous situation before an accident can enable following transportation vehicles to react better to the dangerous situation.

For example, the provision can be carried out when the information about the triggering of the at least one active safety system indicates a triggering of the safety system. Alternatively or additionally, the method can also comprise obtaining information about a speed of the transportation vehicle. The provision of the information about the dangerous situation can be carried out, for example, when (if) the information about the speed of the transportation vehicle indicates a sharp braking of the transportation vehicle. In some exemplary embodiments, the information about the speed of the transportation vehicle can comprise information about a speed change of the transportation vehicle. The information about the change of speed can be used, for example, to detect a braking operation. A validation of the triggering of the at least one active safety system by testing a braking operation can increase the reliability of the provision.

For example, the information about the triggering of one or more functions of the transportation vehicle can comprise one or more indicators about a deployment of the transportation vehicle as a special response transportation vehicle. For example, the determination of the dangerous situation determines information about a deployment of the transportation vehicle as a special response transportation vehicle in such a way that the information about the deployment of the special response transportation vehicle indicates that the transportation vehicle 100 is securing a danger area as a special response transportation vehicle if the one or more indicators about the deployment of the transportation vehicle as a special response transportation vehicle indicate a triggering of a rotating beacon of the transportation vehicle, if information about a driving status of the transportation vehicle indicates that the transportation vehicle is stationary, and if the current activity of the driver corresponds to that of securing a scene of an accident. Thus, the following transportation vehicles can be warned about the danger area and, for instance, the safety of the driver and the special response transportation vehicle can be increased by an increased attention level.

For example, the current activity of the driver corresponds to securing the scene of an accident if a door of the transportation vehicle (of the special response transportation vehicle) is open. Alternatively or additionally, the current activity of the driver can correspond to securing the scene of an accident if a tailgate of the transportation vehicle is open. Alternatively or additionally, the current activity of the driver can correspond to securing the scene of an accident if a driver's seat of the transportation vehicle is occupied.

For example, the method can also comprise obtaining information about a driving status of the transportation vehicle. The driving status can indicate whether the transportation vehicle is moving or is stationary.

For example, the determination can determine the information about the deployment of the special response transportation vehicle such that the information about the deployment of the special response transportation vehicle indicates that the transportation vehicle is driving as a special response transportation vehicle and is in service, if the one or more indicators indicate that a siren of the transportation vehicle is activated and that a rotating beacon of the transportation vehicle is activated, and if the information about the driving status indicates that the transportation vehicle is moving. A detection of the deployment and provision of information about the deployment of the special response transportation vehicle based on the indicators and the driving status reduces the workload of the staff of the special response transportation vehicle and increases the driving safety of the special response transportation vehicle and of transportation vehicles in the area surrounding the special response transportation vehicle.

Alternatively or additionally, the determination can determine the information about the deployment of the special response transportation vehicle such that the information about the deployment of the special response transportation vehicle indicates that the transportation vehicle is securing a danger area as a special response transportation vehicle, if the information about the driving status indicates that the transportation vehicle is stationary and the one or more indicators indicate that a rotating beacon of the transportation vehicle is activated, and the information about the driving status also indicates that a transportation vehicle ignition is activated, or the one or more indicators indicate that a hazard warning unit of the transportation vehicle is activated and that a parking brake functionality of the transportation vehicle is activated, or the one or more indicators indicate that a hazard warning unit of the transportation vehicle is activated and a timer indicates that the transportation vehicle has been stationary for longer than a first time threshold. A detection of the deployment and provision of information about the deployment of the special response transportation vehicle based on the indicators and the driving status reduces the workload of the staff of the special response transportation vehicle and increases the driving safety of the special response transportation vehicle and of transportation vehicles in the area surrounding the special response transportation vehicle.

For example, the transportation vehicle can correspond to a towing or breakdown rescue transportation vehicle. The determination can determine the dangerous situation such that the information about the dangerous situation indicates that the transportation vehicle as a special response transportation vehicle corresponds to a stationary towing or breakdown rescue transportation vehicle, if the information about the driving state indicates that the transportation vehicle is stationary and the one or several indicators show that a rotating beacon of the transportation vehicle is activated and that a hazard warning unit of the transportation vehicle is activated, and a parking brake functionality of the transportation vehicle is activated, or a timer indicates that the transportation vehicle has been stationary for longer than a first time threshold. A detection of the deployment and provision of information about the deployment of the special response transportation vehicle based on the indicators and the driving status reduces the workload of the staff of the special response transportation vehicle and increases the driving safety of the special response transportation vehicle and of transportation vehicles in the area surrounding the special response transportation vehicle.

In some exemplary embodiments the provision can comprise a provision of a Decentralized Environmental Notification Message, DENM. The vehicle-to-vehicle interface can be designed, for example, to communicate in accordance with the vehicle-to-vehicle communication standard 802.11p. The provision can comply, for example, with a direct provision for transportation vehicles in an environment of the vehicle-to-vehicle interface. A direct, broadcast-based provision of the information about the deployment of the special response transportation vehicle can reduce a latency of the transmission and enable transportation vehicles in an environment of the special response transportation vehicle to obtain the information about the deployment of the special response transportation vehicle.

In some exemplary embodiments the determination can also comprise determining a position and/or trajectory of the transportation vehicle. The information about the dangerous situation may also comprise information about the position and/or information about the trajectory of the transportation vehicle (such as a special response transportation vehicle). The information about the position and/or the trajectory of the transportation vehicle enables a targeted warning of other transportation vehicles.

Exemplary embodiments also create a method for a transportation vehicle. The method also comprises obtaining information about a dangerous situation from another transportation vehicle via a vehicle-to-vehicle interface. The information about the dangerous situation is based on information about a triggering of one or more functions of the transportation vehicle and on an activity of a driver of the transportation vehicle. The method also comprises a warning notification, based on the information about the dangerous situation. The method also comprises providing the warning notification via an output module.

Exemplary embodiments also create a program with a program code for implementing at least one of the methods when the program code is executed on a computer, a processor, a control module or a programmable hardware component.

Exemplary embodiments also create a device for a transportation vehicle. The device comprises at least one interface, designed to obtain information about a triggering of one or more functions of the transportation vehicle. The device also comprises a control module, designed to determine a dangerous situation, based on the one or more triggered functions of the transportation vehicle, and depending on a current activity of a driver of the transportation vehicle. The control module is also designed to provide information about the dangerous situation via a vehicle-to-vehicle interface.

Exemplary embodiments also create a device for a transportation vehicle. The device comprises a vehicle-to-vehicle interface, designed to obtain information about a dangerous situation from another transportation vehicle. The information about the dangerous situation is based on information about a triggering of one or more functions of the transportation vehicle and on an activity of a driver of the transportation vehicle. The device also comprises a control module, designed to determine an alert notification, based on the information about the dangerous situation. The control module is also designed to provide the warning notification via an output module.

Various exemplary embodiments will now be described in more detail with reference to the accompanying drawings, in which several exemplary embodiments are shown. In the figures, the thickness dimensions of lines, layers and/or regions are shown exaggerated for the sake of clarity.

In the following description of the attached figures, which only show some exemplary examples, the same reference numerals can be used to designate identical or equivalent components. In addition, collective reference numerals can be used for components and objects, which occur multiple times in at least one exemplary embodiment or in a drawing, but which are described together in relation to one or more features. Components or objects described with the same or collective reference numerals can be embodied in the same way in terms of individual, multiple or all features, for example, in terms of their dimensions, but may also be embodied differently, unless otherwise explicitly or implicitly given by the description.

It is not intended to restrict exemplary embodiments to the particular disclosed forms, but that exemplary embodiments are instead intended to cover functional and/or structural modifications, equivalents and alternatives, which lie within the field of the disclosure. Identical reference numerals designate the same or similar elements throughout the description of the figures.

It is important to note that for any element, which is designated as being "connected" or "coupled" to any other element, it can either be directly connected or coupled to the other element or else intervening elements may be present. If on the other hand, an element is designated as being "directly connected" or "directly coupled" to another element, then there are no intervening elements present. Other terms used to describe the relationship between elements should be interpreted in a similar way (e.g., "between" compared to "directly between", "adjacent" compared to "directly adjacent", etc.).

The terminology used herein is used only for the description of certain exemplary embodiments and is not intended to restrict the exemplary embodiments. As used herein, the singular forms "a" and "an" and "the/this" are also meant to include the plural forms, unless the context clearly indicates otherwise. In addition, it should be clarified that the expressions such as "contains", "containing", "has", "comprises", "comprising" and/or "having" as used herein, indicate the presence of cited features, whole numbers, operations, work processes, elements and/or components, but do not exclude the presence or addition of one more or one or a plurality of features, whole numbers, operations, work processes, elements, components and/or groups thereof.

Unless otherwise defined, all of the terms used herein (including technical and scientific terms) have the same meanings as would be ascribed to them by an average person skilled in the art in the field to which the exemplary embodiments belong. It should also be clarified that expressions, such as those that are defined in commonly used dictionaries, are to be interpreted as if they had the meaning consistent with their meaning in the context of the relevant technology, and should not be interpreted in an idealized or overly formal sense, unless this is expressly defined herein.

Figure 2A:
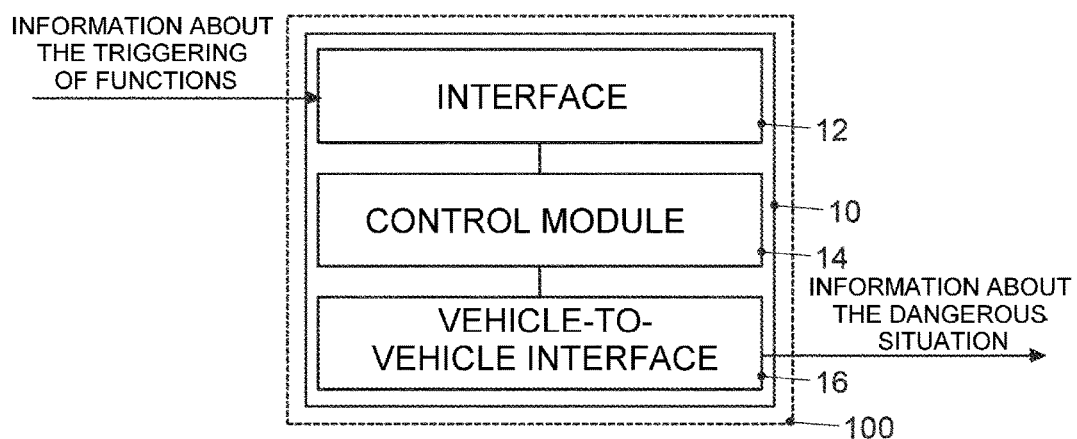
FIG. 2a shows a block diagram of a device for providing information about a dangerous situation.

FIG. 1a shows a flow diagram of a method for a transportation vehicle 100. The method can be implemented in a similar way to at least one of the methods introduced in the FIGS. 1b and 1c. FIG. 2a shows a block diagram of an exemplary embodiment of a corresponding device 10 for the transportation vehicle, with an interface 12 and a control module 14 and a vehicle-to-vehicle interface 16. The control module 14 is coupled to the interface 12 and the vehicle-to-vehicle interface 16. The interface 12, the control module 14 and/or the vehicle-to-vehicle interface 16 can be implemented in a similar way to an interface 12b/c, a control module 14b/c and/or a vehicle-to-vehicle interface 16b/c of FIGS. 2b and/or 2c.

The method comprises obtaining 110 information about a triggering of one or more functions of the transportation vehicle 100, for example, via the interface 12. For example, the information about the triggering of the one or more functions of the transportation vehicle 100 can comprise or correspond to information about a triggering of at least one active safety system of the transportation vehicle 100. For example, obtaining 110 the information about the triggering of the one or more functions of the transportation vehicle can correspond to obtaining 110b information about a triggering of at least one active safety system of the transportation vehicle, as is introduced in connection with FIG. 1b. Alternatively or additionally, the transportation vehicle 100 can be a special response transportation vehicle, for example, and the information about the triggering of the one or more functions of the transportation vehicle 100 can comprise one or more indicators as to the deployment of the special response transportation vehicle (of the transportation vehicle as a special response transportation vehicle), or correspond to these. For example, obtaining 110 the information about the triggering of the one or more functions of the transportation vehicle can correspond to obtaining 110c one or more indicators, as is introduced in connection with FIG. 1b.

In at least some exemplary embodiments the transportation vehicle 100 can correspond, for example, to an agricultural transportation vehicle, a water-borne transportation vehicle, an aircraft, a railway transportation vehicle, a road transportation vehicle, a car, an all-terrain transportation vehicle, a transportation vehicle or a heavy goods transportation vehicle.

The method also comprises determining 130 of a dangerous situation, based on the one or more triggered functions of the transportation vehicle 100, and depending on a current activity of a driver of the transportation vehicle 100. For example, the current activity of the driver can be obtained by implication. For example, the current activity of the driver can correspond to controlling/driving/using the transportation vehicle if the transportation vehicle is driving or at least one active safety system of the transportation vehicle is triggered. For example, the current activity of the driver can correspond to driving the transportation vehicle as a special response transportation vehicle in service, if one or more indicators show that the transportation vehicle (special response transportation vehicle) is in service.

Figure 1B:
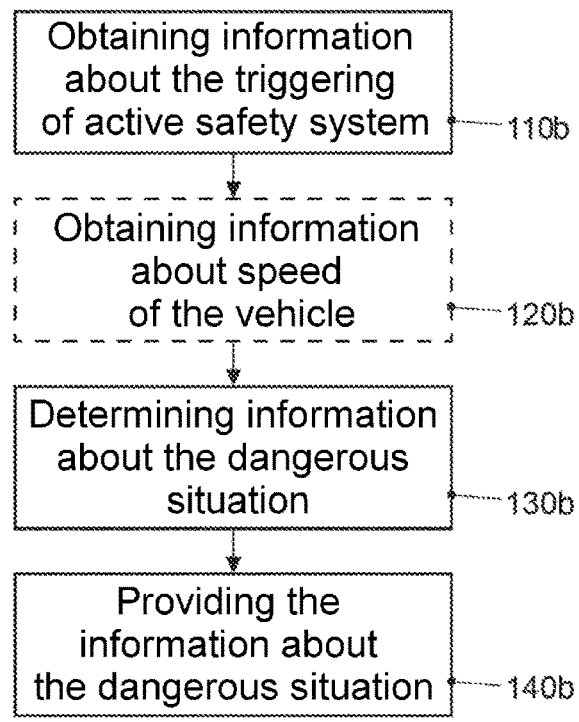
FIG. 1b shows a flow chart of a method for providing information about a hazard.

For example, the determination 130 of the dangerous situation can comprise determining information about a hazard (for example, determining 130b of information about a hazard, as introduced in FIG. 1b) or correspond to the same (for example, based on the information about a triggering of at least one active safety system of the transportation vehicle 100).

For example, the current activity of the driver of the transportation vehicle 100 can correspond to driving or controlling the transportation vehicle 100. For example, the driving of the transportation vehicle by the driver of the transportation vehicle can be deduced from the triggering of the at least one active safety system or be indicated thereby.

Figure 1C:
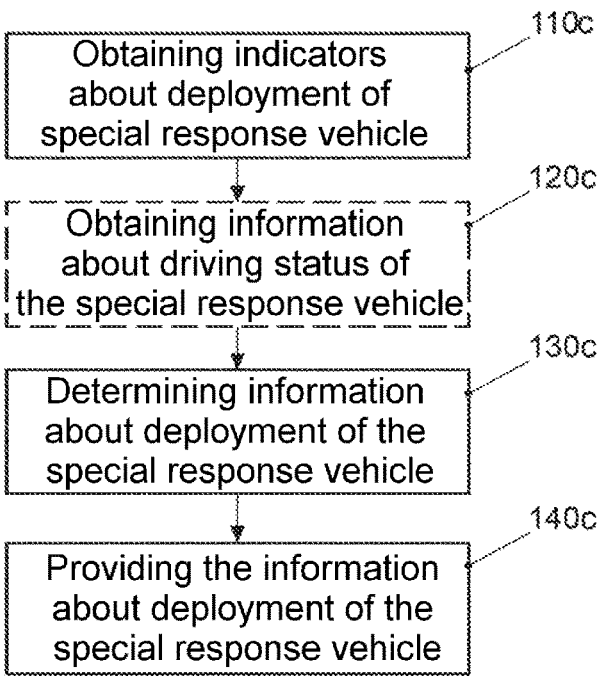
FIG. 1c shows a flow chart of a method for providing information about a deployment of a special response transportation vehicle.

For example, the determination 130 of the dangerous situation can comprise determining information about a deployment of a special response transportation vehicle (for example, determining 130c of information about a deployment of the special response transportation vehicle, as introduced in FIG. 1c) or correspond to the same (for example, based on the one or more indicators about the deployment of the special response transportation vehicle). For example, the current activity of the driver of the transportation vehicle (or of the transportation vehicle itself) can correspond to at least one element of the group consisting of driving the transportation vehicle as a special response transportation vehicle in service, securing a danger area, and deploying the transportation vehicle as a towing or roadside breakdown transportation vehicle.

The method also comprises providing 140 information about the dangerous situation via a vehicle-to-vehicle interface, such as the vehicle-to-vehicle interface 16. For example, the information about the dangerous situation can comprise the information about the hazard and/or the information about the deployment of the special response transportation vehicle. For example, the provision 110 of the information about the dangerous situation can comprise providing 140b a piece of information about a hazard, as is introduced in connection with FIG. 1b, and/or providing 140c information about a deployment of a special response transportation vehicle, as is introduced in connection with FIG. 3c, or can correspond to this.

In conventional systems for warning of hazards on roads, road traffic flow data in central data centers (backend systems) are usually processed and used to detect what kind of traffic situation exists and whether a hazard could be present. Systems that incorporate the status of the individual transportation vehicles are not known. The processing in the backend sometimes results in increased latency times and a greater uncertainty, because the status of a transportation vehicle is often not allowed for. In conventional systems early information is mostly only possible in the absence of a defined location or more detailed information.

Exemplary embodiments of local hazard warning are based on a sender and receiver principle. The sender (transportation vehicle in front) sends a dangerous situation and the receiver (transportation vehicle behind) can receive and process this information. At least some implementation examples relate to a detection of a dangerous situation by the transportation vehicle in front based on trigger criteria.

The trigger criteria described here are based on the triggering actions of active safety systems. These include, for example:

emergency brake warning light (EEBL=Emergency Electronic Brake Light)

autonomous braking intervention (AWV=AnhalteWegVerkürzung [stopping distance reduction])

reversible occupant restraint systems, such as seat belt tensioning before an impact (PreCrash)

Figure 5:
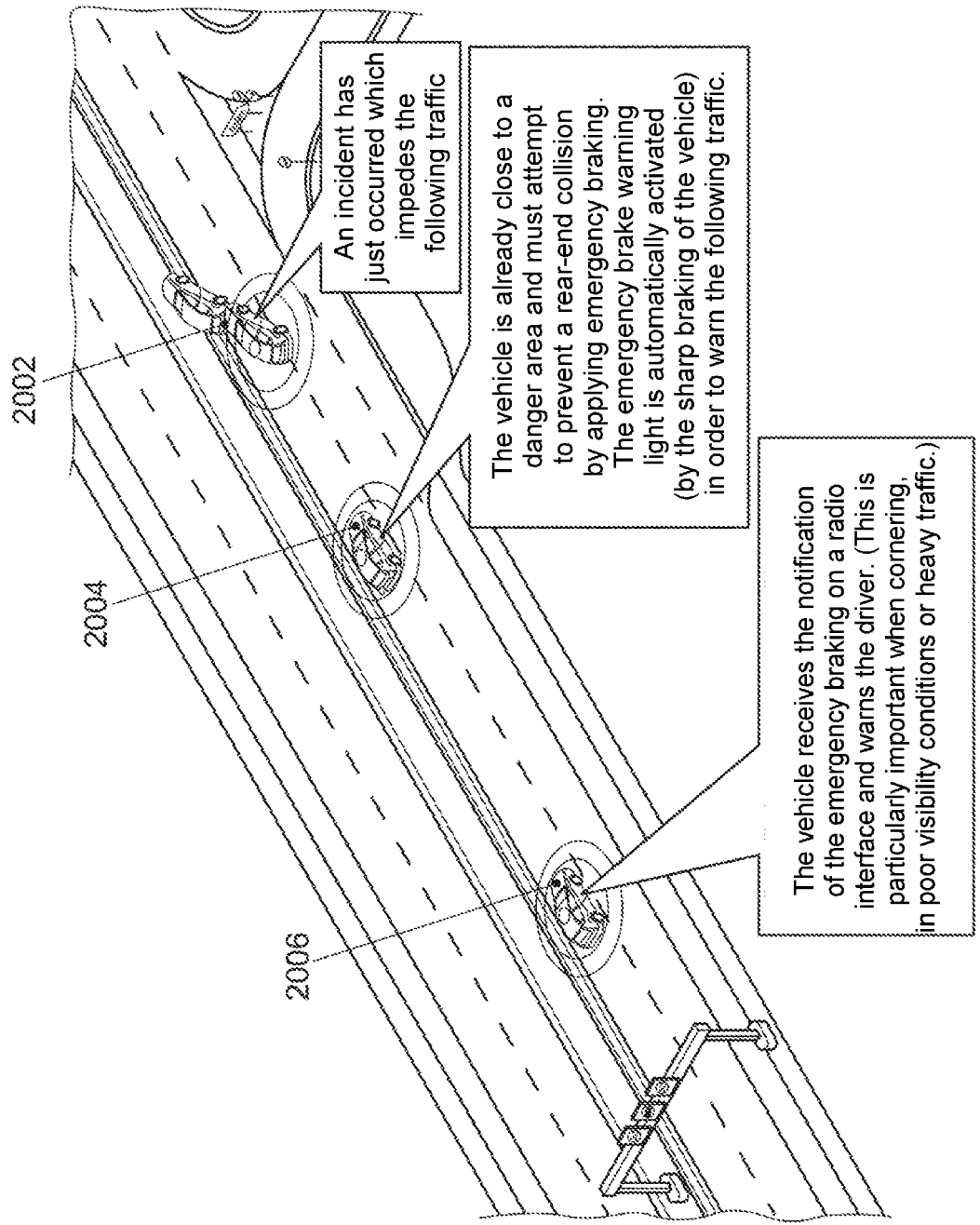
FIG. 5 shows an exemplary embodiments of a method for providing information about a hazard.

FIG. 5 shows an exemplary embodiment. In road traffic a situation 2002 occurs which impedes the following traffic. A following transportation vehicle 2004 is already close to the dangerous location and must try to avoid a rear-end collision by applying the emergency brake. Due to the sharp braking, for example, an emergency brake warning light can be activated to warn the following traffic. In exemplary embodiments, for example, additional information on the hazard can be provided to transportation vehicles in a surrounding area via a vehicle-to-vehicle interface. Another following transportation vehicle 2006 receives, via the vehicle-to-vehicle interface, which can be implemented as a radio interface, the information about the hazard with the message about the use of the emergency brake, and can be designed to warn the driver. This can be beneficial when cornering, in poor visibility conditions, or heavy traffic.

Figure 2B:
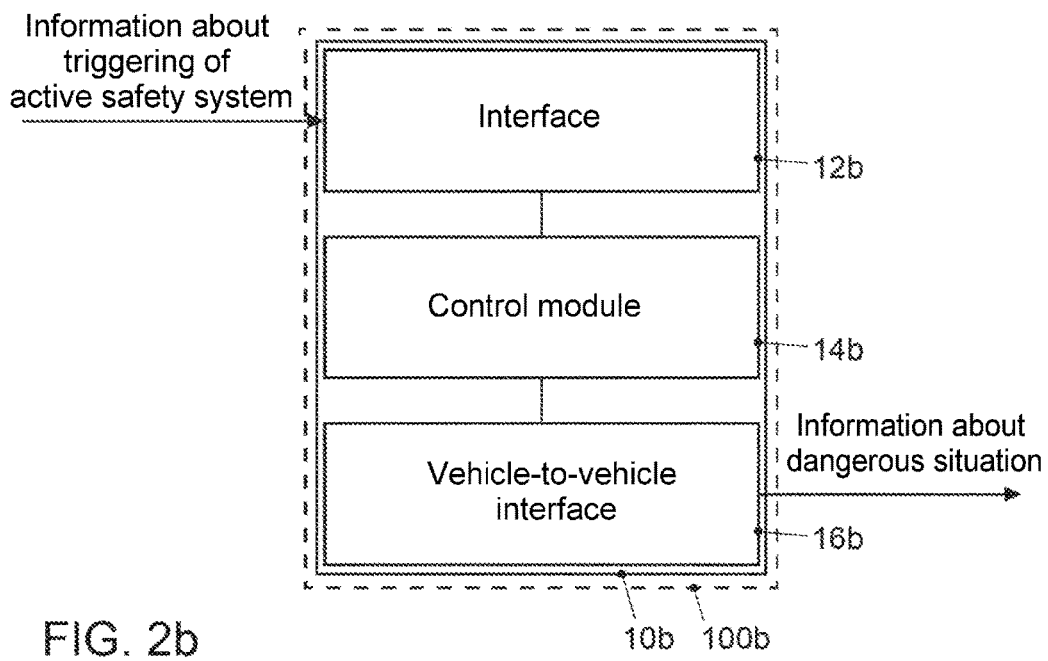
FIG. 2b shows a block diagram of a device for providing information about a hazard.
Figure 2C:
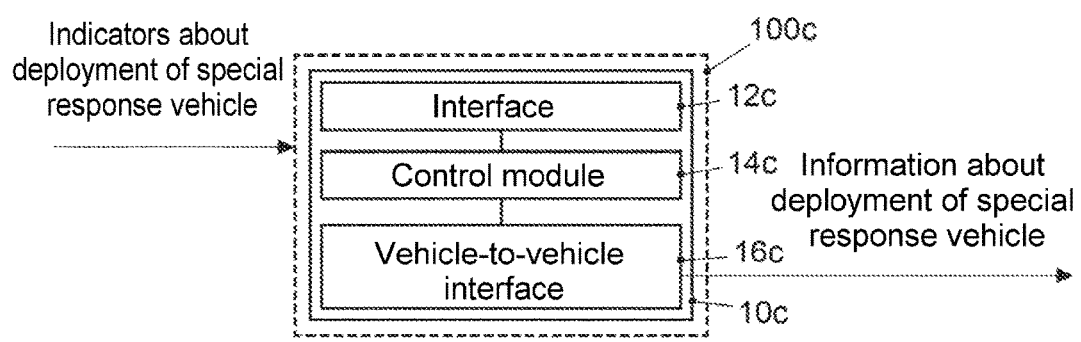
FIG. 2c shows a block diagram of a device for providing information about a deployment of a special response transportation vehicle.

FIG. 1 shows a flow diagram of an exemplary embodiment of the method for a transportation vehicle 100b. The method can be implemented in a similar way to at least one of the methods introduced in FIGS. 1a and 1c. The transportation vehicle 100b can correspond, for example, to the transportation vehicle 100 from FIG. 1. The current activity of the driver of the transportation vehicle 100b corresponds to a control/driving of the transportation vehicle 100b. For example, the current activity of the driver can correspond to controlling/driving/using the transportation vehicle if the transportation vehicle is driving or at least one active safety system is triggered. The one or more functions comprise at least one active safety system of the group comprising a safety system for triggering a flashing light based on emergency braking, safety system for autonomous braking intervention, and safety system for a reversible transportation vehicle occupant restraint system. FIG. 2b illustrates a block diagram of an exemplary embodiment of a device 10b for the transportation vehicle 100b. For example, the device 10b can be designed to execute the method.

The method comprises obtaining 110b information about a triggering of at least one active safety system. The at least one safety system can also comprise, for example, an electronic stability program. The device 10b from FIG. 2b comprises at least one interface 12b, which is designed to obtain 110b information about a triggering of at least one active safety system. The at least one interface 12b can correspond, for example, to one or more inputs and/or one or more outputs for receiving and/or transmitting information, for example, in digital bit values, based on a code, within a module, between modules, or between modules of different entities.

For example, the information about the triggering of one or more functions of the transportation vehicle can comprise information about a triggering of the at least one active safety system. In at least some exemplary embodiments, the information about the triggering of the at least one active safety system can be based on a detection of an impending accident. For example, the obtaining 110b can comprise obtaining of messages on a transportation vehicle communication bus, for example, on a controller network bus (Controller Area Network Bus, CAN bus) or on a local connection network (also Local Interconnect Network, LIN). For example, the obtaining 110b can comprise a readout or monitoring of data packets, for example, restricted by a transmitter or header data-based filter. The at least one interface 12b can be designed, for example, to obtain data via a CAN bus or a LIN. The obtaining 110b of the information about the triggering of the at least one active safety system can take place, for example, before an impending accident. The active safety system can be designed, for example, to provide the information about the triggering of the active safety system before an accident. Alternatively or additionally, the obtaining 110b can also comprise a readout or querying of values in a control register or a database.

In at least some exemplary embodiments the method may also comprise obtaining 120b information about a speed of the transportation vehicle 100b. The at least one interface 12b can also be designed, for example, to obtain 120b information about a transportation vehicle speed of the transportation vehicle 100b. The information about the speed of the transportation vehicle 100b can comprise, for example, information about a change in speed of the transportation vehicle. The information about the speed and/or the change in speed of the transportation vehicle 100b can be detected via a transportation vehicle bus, for example, the CAN bus (Controller Area Network), for example, based on data packets on the CAN bus. For example, filtered information on the acceleration can be used, which has been cleaned to remove sensor noise. In some exemplary embodiments, the information about the acceleration is not based on a global satellite positioning system.

The procedure also comprises determining 130b of information about a hazard, based on the information about the triggering of the at least one active safety system. The information on the hazard can correspond, for example, to a Decentralized Environmental Notification Message (DENM) of a vehicle-to-vehicle communication protocol. For example, the information about the hazard can indicate that a possible hazard exists to a source of information about the hazard. For example, the information on the hazard can comprise information about a position of the hazard, of the transportation vehicle 100b or the source of the information about the hazard. For example, the positioning for the information about the hazard can be based on a satellite-based positioning system, such as the Global Positioning System (GPS). The information about the hazard may in some exemplary embodiments also comprise information about a trigger of the information about the hazard, information about the severity of the hazard and/or information about a time and/or time period of the hazard or a trigger of the hazard, such as the triggering of the active safety system.

In at least some exemplary embodiments the determination 130b can also comprise validating the information about the hazard based on the information about the speed of the transportation vehicle 100b. The control module 14b can be designed to validate or plausibility check the information about the hazard based on the information about the speed of the transportation vehicle. For example, the control module 14b can be designed to determine the information about the hazard only if the information about the speed of the transportation vehicle 100b indicates a sharp braking of the transportation vehicle 100b.

FIG. 2b also shows the device 10b comprising a control module 14b, which is designed to execute the determination method operation at 130b. In exemplary embodiments, the control module 14b and/or a control module 24b from FIG. 4b, can correspond to any controller or processor or a programmable hardware component.

For example, the control module 14b; 24b can also be implemented as software, which is programmed for a corresponding hardware component. In this respect, the control module 14b; 24b can be implemented as programmable hardware with an appropriately adapted software.

Any type of processors, such as digital signal processors (DSPs) can be used for this. Exemplary embodiments are not restricted to a specific type of processor. Any number of processors or even multiple processors are conceivable for the implementation of the control module 14b; 24b.

The method also comprises providing 140b the information about the hazard via a transportation vehicle-to-vehicle interface. The control module 14b from FIG. 2b is designed, for example, to provide 140b via a vehicle-to-vehicle interface 16b. The control module 14b is coupled to the at least one interface 12b and the vehicle-to-vehicle interface 16b.

Figure 4A:
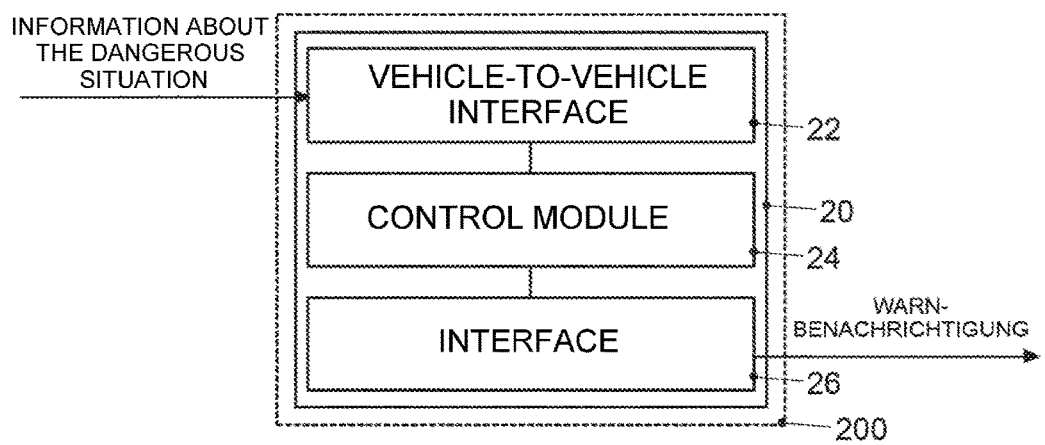
FIGS. 4a-c show block diagrams of devices for providing a warning notification.
Figure 4B:
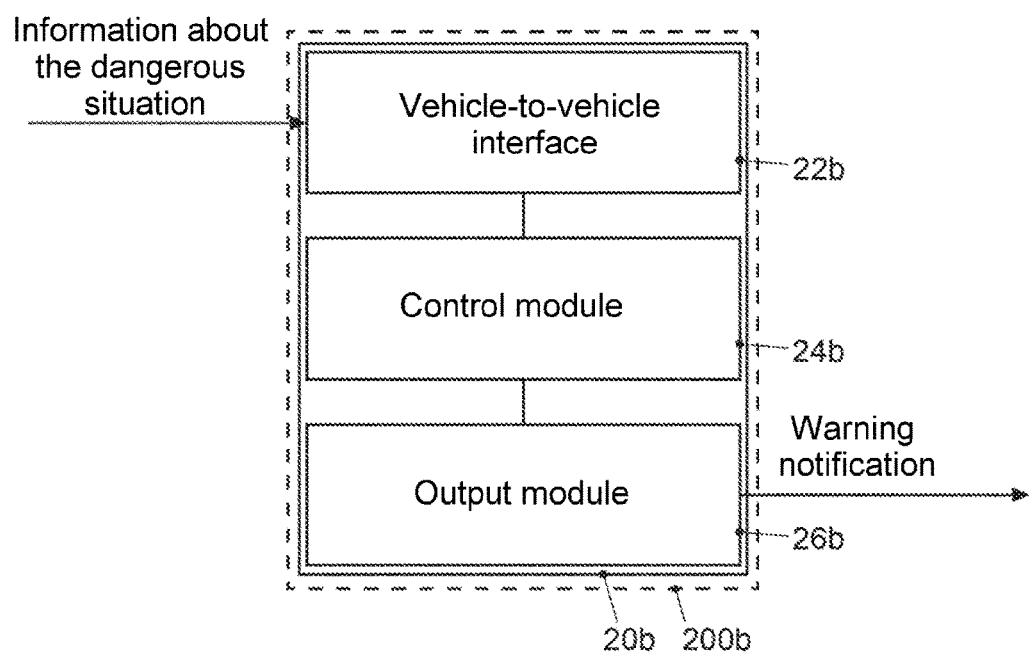

A vehicle-to-vehicle communication via the vehicle-to-vehicle interface, such as the vehicle-to-vehicle interface 16b or a vehicle-to-vehicle interface 22b from FIG. 4b, can take place, for example, via a shared communication channel (also shared channel, broadcast channel), and the vehicle-to-vehicle interface 16b; 22b can be designed to provide the information on the hazard as a message to multiple recipients (also broadcast) via the vehicle-to-vehicle communication connection. In some exemplary embodiments, the vehicle-to-vehicle communication link can be a direct wireless communication link between two transportation vehicles, for example, without the use of a base station, for example, in accordance with IEEE 802.11p (a standard of the Institute of Electrical and Electronics Engineers). The vehicle-to-vehicle interface 16b; 22b can be designed, for example, to communicate directly with other transportation vehicles in a surrounding area by wireless. In some exemplary embodiments the provision 140b can comprise, for example, a provision of a Decentralized Environmental Notification Message, DENM.

In at least some exemplary embodiments, the provision 140b can be carried out, for example, when the information about the triggering of the at least one active safety system indicates a triggering of the safety system. In addition, in some exemplary embodiments the provision 140b or the determination 130b can be based on, validated by or triggered by the fact that the information about the speed of the transportation vehicle 100b indicates a sharp braking of the transportation vehicle 100b.

In some exemplary embodiments, the information about the hazard can comprise information about the safety system triggered. In this case, for example, a prioritization of the active safety systems can place, for example, the autonomous braking intervention above the reversible occupant restraint system and the emergency brake warning light.

If another application with a higher priority is available, then the provision 140b of the information about the hazard can be terminated, for example, so as to provide information about an accident, for instance. Furthermore, the information about the hazard can be discarded if it is no longer valid. As long as the triggering criteria are met, then it is possible periodically, for instance, every 100 ms, to provide 140 the information about the hazard afresh, for example, in an updated version.

Figure 6:
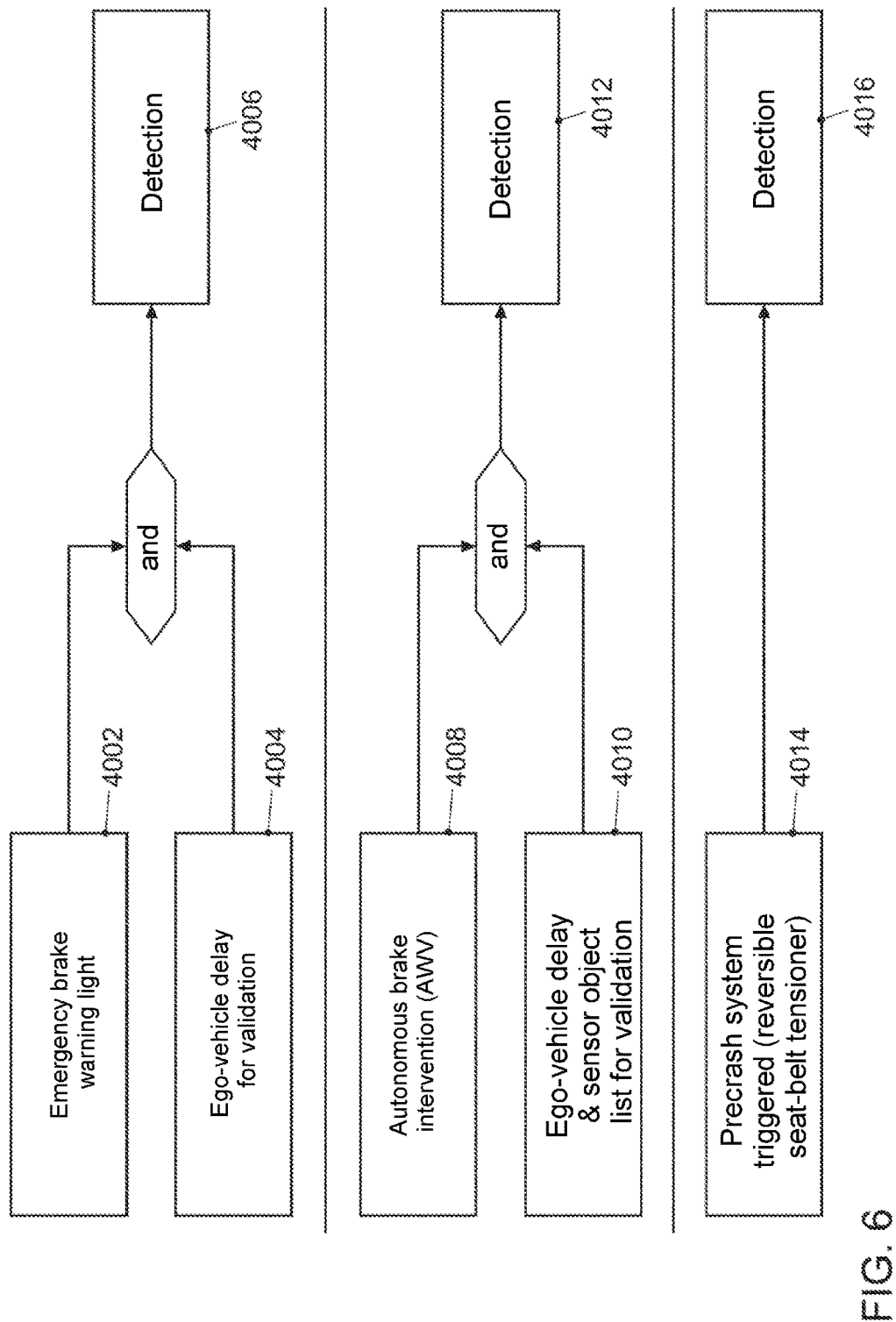
FIG. 6 shows another exemplary embodiment of a method for providing information about a hazard.

FIG. 6 shows an exemplary embodiment in which the following conditions for providing 140b the information about the hazard, for instance, as a DENM, can be fulfilled. For example, information about triggering of an emergency brake warning light 4002, information about an intervention of a safety system for autonomous braking intervention 4008, or information about triggering of a reversible occupant restraint system of 4014 can be received as information about the triggering of the at least one active safety system 110b.

The information about the triggering of the at least one active safety system can be validated, for example, during the determination 130b, based on driving parameters. For example, the information about the hazard can be validated or plausibility checked 4004; 4010, for example, based on a negative acceleration of the transportation vehicle. This can be effected to check the information about the triggering of the at least one active safety system, which was received via the CAN bus for example, as to whether a dangerous situation exists or merely misinformation. This can take place, for example, after a delay. For example, the determination 130b and/or provision 140b are based on the assumption that the acceleration is less than −4 m/s2, which can correspond to a sharp braking maneuver. In some exemplary embodiments, for example, if the information about the triggering of the reversible occupant restraint system is received 110b, then in some exemplary embodiments a validation by driving data can be waived.

If the conditions are satisfied, a potential hazard may be detected 4006; 4012; 4016 and the information about the hazard determined 130b and/or provided 140b. Providing 140b the information about the hazard can take place in an exemplary implementation within 100 ms after determining 130b the information about the hazard.

More details of the method and the device are mentioned in connection with the concept or examples that were described earlier (e.g., FIG. 1a-2a). The method and/or the device can comprise one or more additional optional features, which correspond to one or more embodiments of the proposed concept or the examples described, whether described above or below.

In conventional systems for warning of hazards on roads, road traffic flow data in central data centers (backend systems) are usually processed and used to detect what kind of traffic situation exists and whether a hazard could be present. The processing in the backend sometimes results in increased latency times and a greater uncertainty, because the status of a transportation vehicle is often not allowed for. In conventional systems early information is mostly only possible in the absence of a defined location or more detailed information.

Exemplary embodiments of local hazard warnings are based on a sender and receiver principle. The sender (transportation vehicle in front) sends a dangerous situation and the receiver (transportation vehicle behind) can receive and process this information. At least some exemplary embodiments relate to providing information about a deployment of a special response transportation vehicle by the transportation vehicle in front based on triggering criteria, which allows special response transportation vehicles to behave in the same or at least a similar way to the corresponding function versions.

In the deployment of emergency service transportation vehicles, such as the police, ambulances or towing transportation vehicles, a distinction can be made, for example, between three categories of deployment:

warning of an emergency transportation vehicle in service (Emergency Transportation Vehicle Warning), such as in the case of transportation vehicles with right of way, such as the police and ambulances warning of a stationary safeguarding transportation vehicle (also Stationary Safeguarding Emergency Transportation Vehicle Warning), mostly police warning of a stationary towing or breakdown transportation vehicle (Stationary Wrecking Service Warning)

Figure 7:
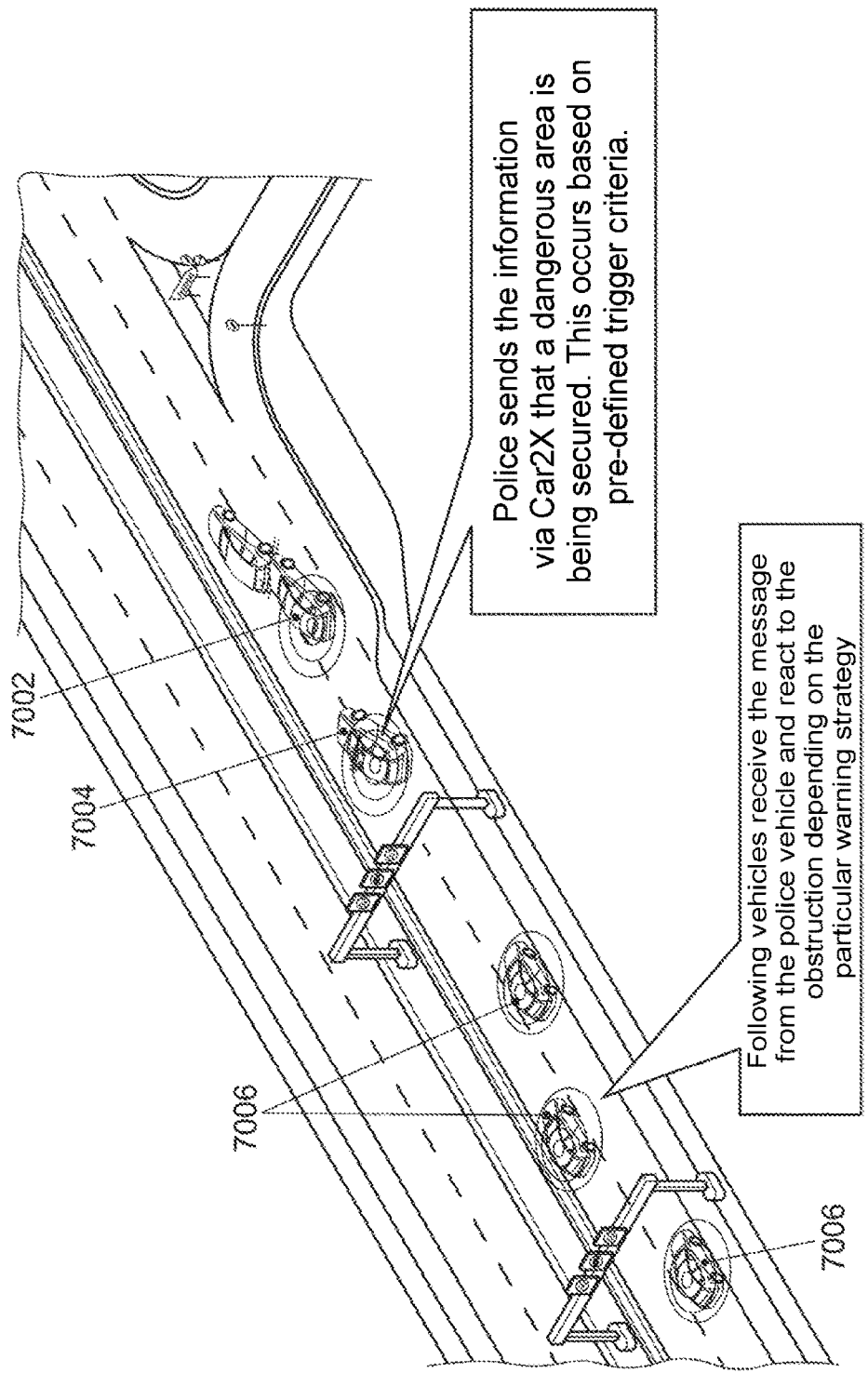
FIG. 7 shows an exemplary embodiment of a method for providing information about a deployment of a special response transportation vehicle.

FIG. 7 shows an example of an exemplary embodiment. At the site of an accident 7002 a police special response transportation vehicle 7004 secures the accident site, and sends information via a vehicle-to-vehicle interface (such as a Car2X interface) about a deployment of the special response transportation vehicle, such as securing the hazard site, to transportation vehicles in the surrounding area of the emergency rescue transportation vehicle 7004, such as following transportation vehicles 7006. This takes place on the basis of predefined trigger criteria. The following transportation vehicles 7006 receive the message from the police transportation vehicle and can react to the obstacle depending on the particular warning strategy.

FIG. 1c shows a flow diagram of an exemplary embodiment of the method for a transportation vehicle 100c. The method can be implemented in a similar way to at least one of the methods introduced in FIGS. 1a and 1b. The transportation vehicle 100c (which can correspond, for instance, to the transportation vehicle 100 from FIG. 1a) corresponds in at least some exemplary embodiments to a special response transportation vehicle. The information about the triggering of one or more functions of the transportation vehicle comprises one or more indicators about a use of the transportation vehicle 100c as a special response transportation vehicle. For example, a determination 130c of the dangerous situation determines information about a deployment of the transportation vehicle as a special response transportation vehicle in such a way that the information about the deployment of the special response transportation vehicle indicates that the transportation vehicle 100c is securing a danger area as a special response transportation vehicle, if the one or more indicators about the deployment of the transportation vehicle as a special response transportation vehicle indicate a triggering of a rotating beacon of the transportation vehicle 100c, if information about a driving status of the transportation vehicle 100c indicates that the transportation vehicle 100c is stationary, and if the current activity of the driver corresponds to that of securing a scene of an accident. For example, the current activity of the driver can correspond to that of securing a scene of an accident if a door of the transportation vehicle (special response transportation vehicle) 100c is open, a tailgate of the transportation vehicle 100c is open, or a driver's seat of the transportation vehicle 100c is occupied.

For example, the current activity of the driver of the transportation vehicle (or of the transportation vehicle itself) can correspond to at least one element of the group consisting of driving the transportation vehicle as a special response transportation vehicle in service, securing a danger area, and deploying the transportation vehicle as a towing or roadside breakdown transportation vehicle. For example, the current activity of the driver can correspond to an activity that corresponds to the deployment (determined by determining 130c the information about the deployment of the special response transportation vehicle) of the special response transportation vehicle.

The transportation vehicle (special response transportation vehicle) 100c can correspond to a rescue transportation vehicle belonging to the police, a rescue transportation vehicle from the fire brigade, a rescue transportation vehicle from the highway patrol, an ambulance, a towing or breakdown transportation vehicle, a salvage transportation vehicle or an accident safeguarding transportation vehicle. FIG. 3c illustrates a block diagram of an exemplary embodiment of a device 10c for the transportation vehicle 100c, designed to execute the method. Exemplary embodiments also create the transportation vehicle 100c comprising the device 10c.

The method comprises obtaining 110c one or more indicators relating to a deployment of the transportation vehicle 100c. The device 10c comprises at least one interface 12c, which is designed for obtaining 110c. The at least one interface 12c can correspond, for example, to one or more inputs and/or one or more outputs for receiving and/or transmitting information, for example, in digital bit values, based on a code, within a module, between modules, or between modules of different entities. For example, the obtaining operation at 110c can comprise obtaining messages on a transportation vehicle communication bus, for example, on a controller network bus (Controller Area Network Bus, CAN bus) or on a local connection network (also Local Interconnect Network, LIN). For example, the obtaining 110c can comprise a readout or monitoring of data packets, for example, restricted by a transmitter or header data-based filter. The at least one interface 12c can be designed, for example, to obtain data via a CAN bus or a LIN.

The one or more indicators can indicate at least one element of the group consisting of: siren of the transportation vehicle 100c is active/inactive, rotating beacon of the transportation vehicle 100c is active/inactive, hazard warning unit of the transportation vehicle 100c is active/inactive, parking brake functionality of the transportation vehicle 100 is active/inactive, information panel of the transportation vehicle 100c is active/inactive, door is open/closed, tailgate is open/closed, and driver's seat is occupied/not occupied.

In some embodiments, shown in FIG. 1a, the method also comprises obtaining 120c information about a driving status of the transportation vehicle 100c. The driving status indicates whether the transportation vehicle 100c is moving or stationary. For example, the driving condition can also indicate whether an ignition of the transportation vehicle and/or a switched plus from the ignition starting switch (terminal 15) is enabled. In some embodiments, the information about the driving status can be obtained via the CAN bus 120c, and not be based on a satellite-based positioning service.

The method also comprises determination 130c of information about a deployment of the transportation vehicle 100c based on the one or more indicators about the deployment of the transportation vehicle 100c. The determination 130c can comprise, for example, evaluating whether a deployment of the transportation vehicle is taking place. The determination 130c can comprise, for example, a comparison of the indicators with a decision structure or a decision table, which indicates the circumstances/indicators under which a deployment/type of deployment is given. The deployment of the transportation vehicle (and/or the current activity of the driver) can correspond, for example, to an emergency deployment of the transportation vehicle, such as a police transportation vehicle deployment, ambulance deployment, fire brigade deployment, rescue service deployment or breakdown/towing truck deployment, securing a scene of an accident, safeguarding traffic or salvaging/towing of a transportation vehicle.

The device 10c comprises a control module 14c, designed for the determination 130c. In exemplary embodiments, the control module 14c and/or a control module 24c from FIG. 4c, can correspond to any controller or processor or a programmable hardware component. For example, the control module 14c; 24c can also be implemented as software, which is programmed for a corresponding hardware component. In this respect, the control module 14c; 24c can be implemented as programmable hardware with an appropriately adapted software. Any type of processors, such as digital signal processors (DSPs) can be used for this. Exemplary embodiments are not restricted to a specific type of processor. Any number of processors or even multiple processors are conceivable for the implementation of the control module 14c; 24c.

Special response transportation vehicles are transportation vehicles that are selected and entitled to be deployed in an emergency. They are often operated by organizations, for example, as part of the public administration, but can also be operated by non-profit organizations and commercial providers. Special response transportation vehicles often have permission to temporarily break the road traffic regulations that apply to normal transportation vehicles, to reach their destination as quickly as possible, for example, by crossing an intersection on a red traffic light or by exceeding a speed limit.

For determining information about a deployment of a special response transportation vehicle as a warning of an emergency transportation vehicle (or transportation vehicle 100c) in service, in at least some exemplary embodiments it is a precondition that a transportation vehicle ignition is active (terminal 15 is enabled) and that the transportation vehicle is in fact a special response transportation vehicle.

In at least some embodiments the transportation vehicle 100c can be in service as a special response transportation vehicle, for example, on the way to an operation site. The determining 130c can in this case determine the information about the deployment of the special response transportation vehicle 100c such that the information about the deployment of the transportation vehicle 100c indicates that the transportation vehicle 100c is driving and is in service. A precondition for this is, for example, that the one or more indicators indicate that a siren of the transportation vehicle 100c is activated. A further precondition may be that a rotating beacon of the transportation vehicle 100c is activated. A further precondition may be that the information about the driving status indicates that the transportation vehicle 100c is driving. If the preconditions are met, then the determining operation at 130c can be carried out and a providing operation at 140c can be carried out.

The siren can correspond, for example, to an acoustic warning module that is designed, for example, to provide acoustic warning signals or acoustic warning messages to a public. The siren can correspond, for example, to a police siren. The rotating beacon can correspond, for example, to an optical signal generator, such as one or more signal lamps, which in some exemplary embodiments are designed to provide light in a predefined user, to fulfill an alert function.

In at least some embodiments, the transportation vehicle secures a stationary danger area, such as in the event of an accident or a fire. The determining 130c can in this case determine the information about the deployment of the transportation vehicle 100c such that the information about the deployment of the transportation vehicle 100c indicates that the transportation vehicle 100c is securing a danger area. A precondition for this may be that the information about the driving status indicates that the transportation vehicle 100c is stationary. A further precondition can be that the one or more indicators indicate that the rotating beacon of the transportation vehicle 100c is activated. A further precondition may be that the information about the driving status also indicates that a transportation vehicle ignition 100c is activated or that the one or more indicators indicate that a hazard warning unit of the transportation vehicle 100c is activated and a parking brake functionality of the transportation vehicle 100c is activated. Alternatively or additionally, the one or more indicators can indicate that a hazard warning unit of the transportation vehicle 100c is activated and a timer indicates that the transportation vehicle 100c has been stationary for longer than a first time threshold.

The first time threshold value can be, for example, 15 s, 30 s, 45 s, 60 s, 90 s, 120 s, 240 s, 300 s or 360 s. The device 10c can comprise, for example, the timer, which may be implemented by the control module 14c, or in a timer module. In some exemplary embodiments it may be ruled out that the determining operation determines the information about the deployment in such a way that the special response transportation vehicle is in service and driving and that it is securing a scene of an accident at the same time.

In some exemplary embodiments the determining operation at 130c determines the information about the deployment of the transportation vehicle 100c such that the information about the deployment of the transportation vehicle 100c indicates that the transportation vehicle 100c is securing a danger area. A precondition for this could be that the one or more indicators also indicate that a door of the transportation vehicle 100c is open, or that a tailgate of the transportation vehicle 100c is open, or that a driver's seat of the transportation vehicle 100c is occupied. For this purpose, the control module 14c can be designed to evaluate camera data, or the information about the indicators can include information about a seat belt test. If the preconditions are met, then the determining operation at 130c can be carried out and a providing operation at 140c can be carried out.

In some exemplary embodiments, the transportation vehicle 100c can correspond to a towing or breakdown transportation vehicle, which (or the driver of which) is providing roadside assistance or salvaging another transportation vehicle, for example. The determining 130c can determine the information about the deployment of the special response transportation vehicle 100c such that the information about the deployment of the special response transportation vehicle 100c indicates that the special response transportation vehicle 100c corresponds to a towing or breakdown transportation vehicle. A precondition for this may be that the information about the driving status indicates that the transportation vehicle 100c is stationary. A further precondition may be that the one or more indicators indicate that a rotating beacon of the transportation vehicle 100c is activated and/or that a hazard warning unit of the transportation vehicle 100c is activated. A further precondition may be that the one or more indicators indicate that a parking brake functionality of the transportation vehicle 100c is activated, for example, a handbrake has been applied or a park position of an automatic transmission is activated. It may also be a precondition that the timer indicates that the transportation vehicle 100c has been stationary for longer than a first time threshold. For example, the timer can be started when the rotating beacon is activated and the transportation vehicle 100c is stationary. If it is no longer active, the timer can be reset. The timer can also be reset if the transportation vehicle 100c is moving. If the preconditions are satisfied, the determination 130c can be carried out and a provision 140c can be carried out.

The method also comprises providing 140c the information about the deployment of the transportation vehicle 100c via a vehicle-to-vehicle interface. The control module 14c is also designed for the provision 140c. The device also comprises the vehicle-to-vehicle interface 16c, which can correspond to the vehicle-to-vehicle interface of the method operation at 140. The control module 14c is coupled to the at least one interface 12c and the vehicle-to-vehicle interface 16c. In at least some exemplary embodiments the determination 130c can correspond to a triggering of the provision 140c, based on the one or more indicators. If these are satisfied, the information about the deployment can be determined 130c and/or provided 140c.

Figure 4C:
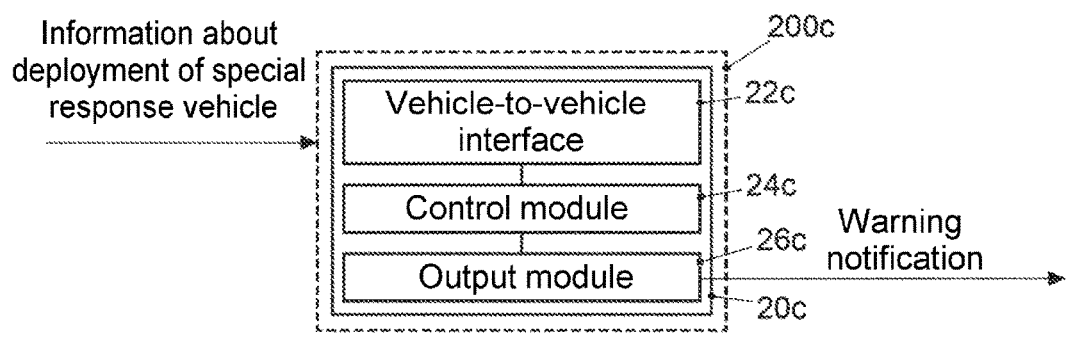

A vehicle-to-vehicle communication via the vehicle-to-vehicle interface, such as the vehicle-to-vehicle interface 16c or a vehicle-to-vehicle interface 22c from FIG. 4c, can take place, for example, via a shared communication channel (also shared channel, broadcast channel), and the vehicle-to-vehicle interface 16c; 22c can be designed to provide the information on the hazard as a message to multiple recipients (also broadcast) via the vehicle-to-vehicle communication connection. In some exemplary embodiments, the vehicle-to-vehicle communication link can be a direct wireless communication link between two transportation vehicles, for example, without the use of a base station, for example, in accordance with IEEE 802.11p (a standard of the Institute of Electrical and Electronics Engineers). The vehicle-to-vehicle interface 16c; 22c can be designed, for example, to communicate directly with other transportation vehicles in a surrounding area by wireless. In some exemplary embodiments the provision 140c can comprise, for example, a provision of an event-based message, for example, a Decentralized Environmental Notification Message (DENM). The provision 140 can, for example, correspond to a direct provision for transportation vehicles in a vicinity of the vehicle-to-vehicle interface, for example, via a direct radio interface without the use of a base station. Alternatively or additionally, the providing 140c can also comprise providing a so-called periodic status message, such as a Cooperative Awareness Message, CAM. The providing 140c of the information about the deployment of the transportation vehicle can correspond, for example, to setting one or more bit values in accordance with a code schema in a data message in accordance with a message protocol, such as that used for vehicle-to-vehicle communication.

In at least some exemplary embodiments, the information about the deployment of the transportation vehicle can also comprise information about one or more indicators, such as information about which conditions are (not) satisfied by the indicators. This can be effected, for example, by a bit/value-based encoding.

In at least some exemplary embodiments the providing 140c can be executed periodically, for example, every 50 ms, 100 ms, 150 ms, 200 ms, 250 ms, 500 ms, 1 s, 2 s, 5 s, 10 s, for instance, in case the information about the driving status or one or more indicators changes. The providing operation at 140c can be continued, for example, until preconditions are no longer met by the information about the driving status and/or the one or more indicators.

In at least some exemplary embodiments, the determination 130c can also comprise determining a position and/or trajectory of the transportation vehicle. The information about the deployment of the transportation vehicle 100c may also comprise information about the position and/or information about the trajectory of the transportation vehicle 100c. The information about the position/trajectory can be based, for example, on position points and/or motion vectors. For example, the positioning for the information about the hazard can be based on a satellite-based positioning system, such as the Global Positioning System (GPS).

In at least some exemplary embodiments, the information about the deployment of the transportation vehicle can also information about at least one element of the group consisting of a timestamp for a triggering event, a current timestamp, a position, a radius, about the relevance of the information about the deployment, information on a traffic direction in which the information on the deployment is relevant, information about a duration, a validity of the information about the deployment (for instance, 0.5 s, 1 s, 2 s, 5 s), speed of the transportation vehicle, road type of a road on which the transportation vehicle 100c is located, lane of the road on which the special response transportation vehicle 100c is located, type of the special response transportation vehicle and duration of a stationary state of the special response transportation vehicle 100c.

More details of the method and the device are mentioned in connection with the concept or examples that were described earlier (e.g., FIG. 1a-2b). The method and/or the device can comprise one or more additional optional features, which correspond to one or more embodiments of the proposed concept or the examples described, whether described above or below.

Figure 3A:
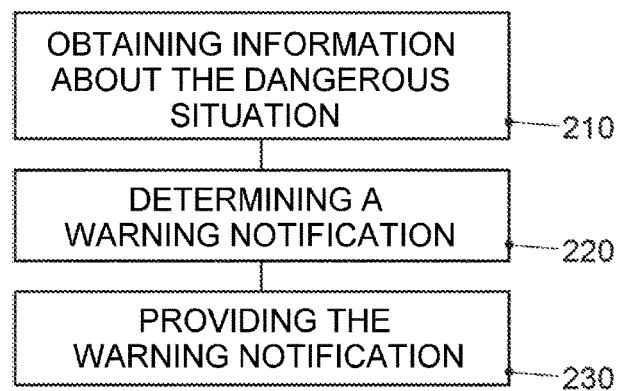
FIGS. 3a-c show flow charts of methods for providing a warning notification.

FIG. 3a shows a flow diagram of a method for a transportation vehicle 200. FIG. 4a shows a block diagram of an exemplary embodiment of a corresponding device 20 with a vehicle-to-vehicle interface 22, a control module 24 and an output module 26 for the transportation vehicle 200. The vehicle-to-vehicle interface 22, the control module 24 and/or the output module 26 can be implemented in a similar way to a vehicle-to-vehicle interface 22b/c, a control module 24b/c and an output module 26b/c, as are introduced in connection with FIG. 4b and/or 4c. In at least some exemplary embodiments the transportation vehicle could correspond, for example, to an agricultural transportation vehicle, a water-borne transportation vehicle, an aircraft, a railway transportation vehicle, a road transportation vehicle, a car, an all-terrain transportation vehicle, a transportation vehicle or a heavy goods transportation vehicle. In some embodiments, the transportation vehicle 100 can also correspond to the transportation vehicle 200, i.e., a transportation vehicle could be designed to execute the method of at least one of the FIGS. 1a-c and at least one of the FIGS. 3a-c. A transportation vehicle could also comprise the device 10; 10b; 10c and a device 20; 20b; 20c from FIG. 4a-c.

The method also comprises obtaining 210 information about a dangerous situation from another transportation vehicle 100 via a vehicle-to-vehicle interface. For example, the information on the hazard situation can comprise information on the hazard and/or information about the deployment of a special response transportation vehicle, such as were introduced in connection with FIGS. 1a-1c. The information about the dangerous situation is based on information about a triggering of one or more functions of the transportation vehicle and on an activity of a driver of the transportation vehicle 100, such as were introduced in connection with FIGS. 1a-1c.

The method also comprises determining 220 a warning notification, based on the information about the dangerous situation. In at least some embodiments, the warning notification can comprise information about a location, a distance and/or a trigger of the hazard situation. The warning notification can be, for example, a visual, tactile or audible warning. The method also comprises providing 230 the warning notification via an output module.

More details of the method and the device are mentioned in connection with the concept or examples that were described earlier (e.g., FIG. 1a-3a). The method and/or the device can comprise one or more additional optional features, which correspond to one or more embodiments of the proposed concept or the examples described, whether described above or below.

Figure 3B:
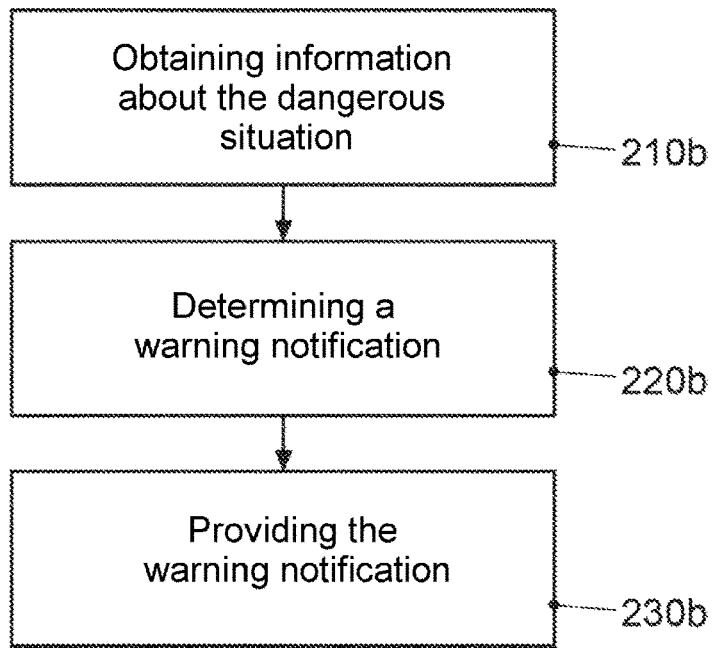
Figure 3C:
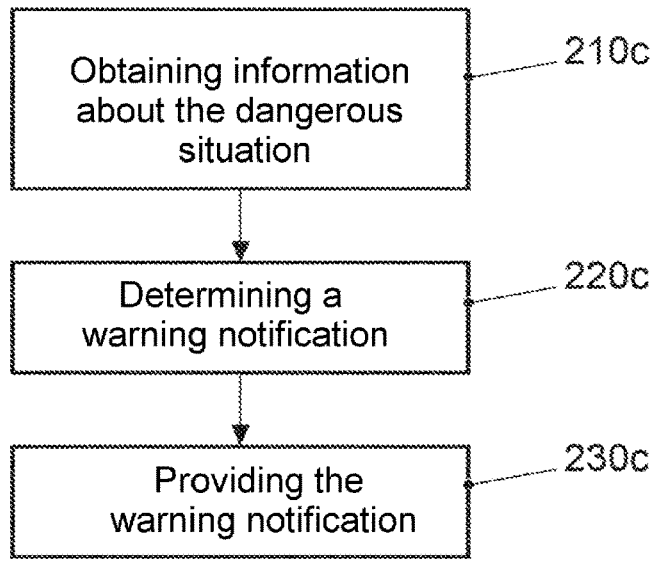

FIG. 3b illustrates a flow diagram of an exemplary embodiment of a method for a transportation vehicle 200b. In at least some exemplary embodiments the transportation vehicle 200b could correspond, for example, to an agricultural transportation vehicle, a water-borne transportation vehicle, an aircraft, a railway transportation vehicle, a road transportation vehicle, a car, an all-terrain transportation vehicle, a transportation vehicle or a heavy goods transportation vehicle. In some embodiments, the transportation vehicle 100b can also correspond to the transportation vehicle 200b, i.e., a transportation vehicle could be designed to execute at least one of the methods of FIGS. 1a-c and 3a-c. A transportation vehicle could also comprise the device 10b of FIG. 2b and a device 20b of FIG. 4b.

The method also comprises obtaining 210b information about a dangerous situation from another transportation vehicle 100b via a vehicle-to-vehicle interface. The information on the hazard is based on information about a triggering of at least one active safety system. In at least some exemplary embodiments, the information about the hazard is additionally based on about a speed of the other transportation vehicle 100b. The other transportation vehicle 100b may be located, for example, in an area surrounding the transportation vehicle 200b.

The method also comprises determining 220b a warning notification, based on the information about the hazard. In at least some embodiments, the warning notification can comprise information about a location, a distance and/or a trigger of the hazard. The warning notification can be, for example, a visual, tactile or audible warning. The method also comprises providing 230b the warning notification via an output module.

FIG. 4b illustrates a block diagram of an exemplary embodiment of a device 20b for the transportation vehicle 200b. The device comprises a vehicle-to-vehicle interface 22b, designed to execute the method operation at 210b (obtaining information about hazard). The device also comprises a control module 24b, designed to execute the method operations at 220b and 230b (determining the warning notification and providing the warning notification), and an output module 26b for providing the warning notification. The output module 26b can be, for example, a screen, a signal lamp, a loudspeaker, a tone generator or a tactile output device, for example, for generating vibrations. The control module 24b is coupled to the vehicle-to-vehicle interface 22b and the output module 26b.

More details of the additional method and the device 20b are mentioned in connection with the concept or examples that were described earlier (e.g., FIG. 1a to 4a). The additional method and/or the device 20b can comprise one or more additional optional features, which correspond to one or more embodiments of the proposed concept or the examples described, as are described above or below.

FIG. 3c illustrates a flow diagram of an exemplary embodiment of a method for a transportation vehicle 200c. The method can be implemented in a similar way to at least one of the methods that were introduced in FIGS. 3a and/or 3b. In at least some exemplary embodiments the transportation vehicle 200c could correspond, for example, to an agricultural transportation vehicle, a road transportation vehicle, a car, an all-terrain transportation vehicle, a transportation vehicle or a heavy goods transportation vehicle. FIG. 4c shows a device 20c for the transportation vehicle, designed to execute the method for the transportation vehicle. Exemplary embodiments also create the transportation vehicle 200c comprising the device 20c. The device 20c can be implemented in a similar way to at least one of the devices that were introduced in FIGS. 4a and/or 4b.

The method comprises obtaining 210c the information about the deployment of the special response transportation vehicle 100c from the special response transportation vehicle 100c via a vehicle-to-vehicle interface. The information about the deployment of the special response transportation vehicle 100c is based on the one or more indicators relating to a deployment of the special response transportation vehicle 100c. The device 20c also comprises the vehicle-to-vehicle interface 22c, designed for obtaining 210 the information about the deployment of the special response transportation vehicle 100c.

The method also comprises determination 220c of a warning notification, based on the information about the deployment of the special response transportation vehicle 100c. In at least some embodiments, the warning notification can comprise information about a location, a distance and/or a trigger of the hazard. The warning notification can be, for example, a visual, tactile or audible warning. The method also comprises providing 230c the warning notification via an output module.

The device 20c also includes the control module 24c, which is designed to determine 220c the warning notification and to provide 230c the warning notification. The device also includes the output module 26c. The output module 26c can be, for example, a screen, a signal lamp, a loudspeaker, a tone generator or a tactile output device, for example, for generating vibrations. The control module 24c is coupled to the vehicle-to-vehicle interface 22c and the output module 26c.

More details of the additional method and the device 20c are mentioned in connection with the concept or examples that were described earlier (e.g., FIGS. 1 to 4b). The additional method and/or the device 20c can comprise one or more additional optional features, which correspond to one or more embodiments of the proposed concept or the examples described, whether described above or below.

Another exemplary embodiment is a computer program for implementing at least one of the methods described above, when the computer program is executed on a computer, a processor or a programmable hardware component. Another exemplary embodiment is also a digital storage medium, which is machine- or computer-readable, and has electronically readable control signals, which can interact with a programmable hardware component such that one of the methods described above is executed.

The features disclosed in the present description, the claims and the drawings can be of significance and implemented both individually as well as in any desired combination to realize an exemplary embodiment in its various configurations.

Although some embodiments have been described in connection with a device, it goes without saying that these embodiments also represent a description of the corresponding method, so that a block or a component of a device is also to be understood as a corresponding method operation or as a feature of a method operation. Similarly, embodiments that have been described in relation to or as a method operation also represent a description of a corresponding block or detail or feature of a corresponding device.

Depending on the specific implementation requirements, exemplary embodiments can be implemented either in hardware or in software. The implementation can be carried out by using a digital storage medium, such as a floppy disk, a DVD, a Blu-Ray disc, a CD, a ROM, a PROM, or an EPROM, EEPROM or Flash memory, a hard disk or other magnetic or optical storage, on which electronically readable control signals are stored, which can interact with a programmable hardware component, or interact in such a way that the respective method is carried out.

A programmable hardware component can be formed by a processor, a computer processor (CPU=Central Processing Unit), a graphics processing unit (GPU=Graphics Processing Unit), a computer, a computer system, an application-specific integrated circuit (ASIC), an integrated circuit (IC), a single-chip system (SOC=System-on-Chip), a programmable logic element or a field-programmable gate array (FPGA) with a microprocessor.

The digital storage medium can therefore be machine- or computer-readable. Some exemplary embodiments thus comprise a data carrier, which has electronically readable control signals that are capable of interacting with a programmable computer system or a programmable hardware component, in such a way that one of the methods described herein is carried out. At least one exemplary embodiment therefore is a data carrier (or a digital storage medium or a computer-readable medium), on which the program is recorded for carrying out one of the methods described herein.

In general, exemplary embodiments can be implemented as software, firmware, computer program or computer program product with a program code or as data, wherein the program code is, or the data are, effective in terms of carrying out one of the methods if the program is running on a processor or a programmable hardware component. The program code or the data can also be stored, for example, on a machine-readable medium or data carrier. The program code or the data can exist as source code, machine code or byte code, among other things, as well as other intermediate code.

Another exemplary embodiment is also a data stream, a signal train or a sequence of signals, which represent or represents the program for carrying out one of the methods described herein. The data stream, the signal train or the sequence of signals can be configured, for example, so as to be transferred over a data communication connection, for example, via the internet or any other network. Exemplary embodiments are thus also signal trains representing data, which are suitable for transferring over a network or a data communication connection, wherein the data represent the program.

A program in accordance with at least one exemplary embodiment can implement one of the methods during its implementation, for example, by the program reading out memory locations or writing a datum or plurality of data into these locations, which enables switching operations or other operations to be invoked in transistor structures, in amplifier structures or in other electrical, optical, magnetic components or components operating according to another functional principle. Accordingly, by reading from a memory location, data, values, sensor values or other information can be recorded, determined or measured by a program. By reading out one or more memory locations, a program can therefore detect, determine or measure variables, values, measurement variables and other information, and can also by writing to one or more memory locations perform, initiate or implement an action, and also control other equipment, machinery and components.

The examples described above only represent an illustration of the principles of the present disclosure. It is implicit that modifications and variations of the arrangements and details described herein will be apparent to other persons skilled in the art. It is therefore intended that the disclosure be limited only by the scope of protection of the following patent claims and not by the specific details, which have been presented herein on the basis of the description and explanation of the exemplary embodiments.

LIST OF REFERENCE NUMERALS

10; 10b; 10c device
12; 12b; 12c interface
14; 14b; 14c control module
16; 16b; 16c vehicle-to-vehicle interface
20; 20b; 20c device
22; 22b; 22c vehicle-to-vehicle interface
24; 24b; 24c control module
26; 26b; 26c output module
100; 100b; 100c transportation vehicle
110; 110b; 110c obtaining
120; 120b; 120c obtaining
130; 130b, 130c determining
140; 140b; 140c deploying
200; 200b; 200c transportation vehicle
210; 210b; 210c obtaining
220; 220b, 220c determining
230; 230b; 230c deploying
2002 dangerous situation
2004 following transportation vehicle
2006 additional following transportation vehicle
4002 triggering of an emergency brake flashing
4004 plausibility check
4006 detection
4008 triggering an autonomous braking intervention
4010 plausibility check
4012 detection
4014 triggering a PreCrash-system
4016 detection
7002 accident
7004 special response transportation vehicle
7006 following transportation vehicles

The invention claimed is:

1. A method for a transportation vehicle, the method comprising:
obtaining information about a triggering of one or more functions of the transportation vehicle;
determining a dangerous situation, based on the one or more triggered functions of the transportation vehicle, and depending on a current activity of a driver of the transportation vehicle; and
providing information about the dangerous situation via a vehicle-to-vehicle interface;
wherein the information about the triggering of one or more functions of the transportation vehicle comprises one or more indicators about a deployment of the transportation vehicle as a special response transportation vehicle, and
wherein determining the dangerous situation comprises determining information about the deployment of the transportation vehicle as the special response transportation vehicle indicating that the transportation vehicle is securing a hazard site as the special response transportation vehicle.

2. The method of claim 1, wherein the current activity of the driver of the transportation vehicle corresponds to a control of the transportation vehicle, and wherein the one or more functions comprise at least one active safety system of the group comprising: safety system for triggering a flashing light based on emergency braking, safety system for autonomous braking intervention, and safety system for a reversible transportation vehicle occupant restraint system.

3. The method of claim 2, wherein the information about the triggering of one or more functions of the transportation vehicle comprises information about a triggering of the at least one active safety system, and
wherein the information about the triggering of the at least one active safety system is based on a detection of an impending accident,
or wherein the obtaining of the information about the triggering of one or more functions of the transportation vehicle takes place before an impending accident,
or wherein the active safety system provides the information about the triggering of the active safety system before an impending accident.

4. The method of claim 3, wherein the provision is carried out when the information about the triggering of the at least one active safety system indicates a triggering of the safety system,
or wherein the method also comprises obtaining information about a transportation vehicle speed, wherein the provision is carried out when the information about the speed of the transportation vehicle indicates a sharp braking of the transportation vehicle.

5. The method of claim 1, wherein the information about the deployment of the special response transportation vehicle indicates that the transportation vehicle is securing the hazard site as the special response transportation vehicle in response to the one or more indicators about the deployment of the transportation vehicle as the special response transportation vehicle indicating a triggering of a rotating beacon of the transportation vehicle, in response to information about a driving status of the transportation vehicle indicating that the transportation vehicle is stationary, and in response to the current activity of the driver corresponding to that of securing a scene of an accident.

6. The method of claim 5, wherein the current activity of the driver corresponds to that of securing the scene of an accident in response to a door of the transportation vehicle being open, a tailgate of the transportation vehicle is open, or a driver's seat of the transportation vehicle is occupied.

7. The method of claim 5, further comprising information about the driving status of the transportation vehicle, wherein the driving status indicates whether or not the transportation vehicle is driving or stationary.

8. The method of claim 7, wherein the determination determines the information about the deployment of the special response transportation vehicle so the information about the deployment of the special response transportation vehicle indicates that the transportation vehicle is driving as a special response transportation vehicle and is in service, in response to the one or more indicators showing that a siren of the transportation vehicle is activated and that the rotating beacon of the transportation vehicle is activated, and in response to the information about the driving status indicating that the transportation vehicle is driving.

9. The method of claim 7, wherein the determination determines the information about the deployment of the special response transportation vehicle so the information about the deployment of the special response transportation vehicle indicates that the transportation vehicle is securing a danger area as the special response transportation vehicle, in response to the information about the driving status indicating that the transportation vehicle is stationary and the one or more indicators indicate that the rotating beacon of the transportation vehicle is activated, and
   the information about the driving status also indicates that a transportation vehicle ignition is activated,
   or the one or more indicators indicate that a hazard warning unit of the transportation vehicle is activated and a parking brake functionality of the transportation vehicle is activated,
   or the one or more indicators indicate that a hazard warning unit of the transportation vehicle is activated and a timer indicates that the transportation vehicle has been stationary for longer than a first time threshold.

10. The method of claim 7, wherein the transportation vehicle corresponds to a towing or breakdown rescue transportation vehicle, and wherein the determining operation determines the information about the deployment of the special response transportation vehicle so the information about the deployment of the special response transportation vehicle indicates that the transportation vehicle is a stationary towing or breakdown rescue transportation vehicle,
   in response to the information about the driving status indicating that the transportation vehicle is stationary and the one or more indicators indicating that the rotating beacon of the transportation vehicle is activated and that a hazard warning unit of the transportation vehicle is activated, and
   a parking brake functionality of the transportation vehicle is activated,
   or a timer indicates that the transportation vehicle has been stationary for longer than a first time threshold.

11. The method of claim 1,
   wherein the provision operation comprises providing a Decentralized Environmental Notification Message,
   or wherein the vehicle-to-vehicle interface communicates in accordance with vehicle-to-vehicle communication standard IEEE 802.11p,
   or wherein the provision operation complies with a direct provision for transportation vehicles in an environment of the vehicle-to-vehicle interface.

12. A method for a transportation vehicle, the method comprising:
   obtaining information about a dangerous situation from another transportation vehicle via a vehicle-to-vehicle interface, wherein the information about the dangerous situation is based on information about a triggering of one or more functions of the transportation vehicle and on an activity of a driver of the transportation vehicle;
   determining a warning notification based on the information about the dangerous situation; and
   providing the warning notification via an output module;
   wherein the information about the triggering of one or more functions of the transportation vehicle comprises one or more indicators about a deployment of the transportation vehicle as a special response transportation vehicle, and
   wherein the information about the dangerous situation comprises information about the deployment of the transportation vehicle as the special response transportation vehicle indicating that the transportation vehicle is securing a hazard site as the special response transportation vehicle.

13. One or more non-transitory machine-readable storage media comprising a plurality of instructions stored thereon that, in response to being executed, cause a device to:
   obtain information about a triggering of one or more functions of a transportation vehicle;
   determine a dangerous situation, based on the one or more triggered functions of the transportation vehicle and depending on a current activity of a driver of the transportation vehicle; and
   provide information about the dangerous situation via a vehicle-to-vehicle interface;
   wherein the information about the triggering of one or more functions of the transportation vehicle comprises one or more indicators about a deployment of the transportation vehicle as a special response transportation vehicle, and
   wherein determining the dangerous situation comprises determining information about the deployment of the transportation vehicle as the special response transportation vehicle indicating that the transportation vehicle is securing a hazard site as the special response transportation vehicle.

14. A device for a transportation vehicle, the device comprising:
   at least one interface to obtain information about a triggering of one or more functions of the transportation vehicle; and
   a control module to:
      determine a dangerous situation, based on the one or more triggered functions of the transportation vehicle, and depending on a current activity of a driver of the transportation vehicle, and
      provide information about the dangerous situation via a vehicle-to vehicle interface,
   wherein the information about the triggering of one or more functions of the transportation vehicle comprises one or more indicators about a deployment of the transportation vehicle as a special response transportation vehicle, and
   wherein determining the dangerous situation comprises determining information about the deployment of the transportation vehicle as the special response transportation vehicle indicating that the transportation vehicle is securing a hazard site as the special response transportation vehicle.

15. A device for a transportation vehicle, the device comprising:
- a vehicle-to-vehicle interface to obtain information about a dangerous situation from another transportation vehicle, wherein the information about the dangerous situation is based on information about a triggering of one or more functions of the transportation vehicle and on an activity of a driver of the other transportation vehicle; and
- a control module to:
  - determine a warning notification, based on the information about the dangerous situation, and
  - provide the warning notification via an output module,
- wherein the information about the triggering of one or more functions of the transportation vehicle comprises one or more indicators about a deployment of the transportation vehicle as a special response transportation vehicle, and
- wherein the information about the dangerous situation comprises information about the deployment of the transportation vehicle as the special response transportation vehicle indicating that the transportation vehicle is securing a hazard site as the special response transportation vehicle.

* * * * *